(12) United States Patent
Akiyama et al.

(10) Patent No.: US 6,577,360 B1
(45) Date of Patent: Jun. 10, 2003

(54) LIQUID CRYSTAL DISPLAY

(75) Inventors: Takashi Akiyama, Sayama (JP); Masafuni Ide, Tokorozawa (JP); Kanetaka Sekiguchi, Sayama (JP); Masami Kikuchi, Kodaira (JP); Yuichi Akiba, Tokorozawa (JP); Koji Nakagawa, Hachioji (JP); Koichi Hoshino, Omiya (JP); Takashi Toida, Tokyo (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/462,566

(22) PCT Filed: Jul. 10, 1998

(86) PCT No.: PCT/JP98/03108
§ 371 (c)(1),
(2), (4) Date: Apr. 27, 2000

(87) PCT Pub. No.: WO99/03017
PCT Pub. Date: Jan. 21, 1999

(30) Foreign Application Priority Data

Aug. 10, 1997 (JP) .............................................. 9-185310

(51) Int. Cl.⁷ ............................................. G02F 1/1335
(52) U.S. Cl. .......................... 349/96; 349/97; 349/106; 349/117
(58) Field of Search ........................... 349/96, 97, 106, 349/107, 108, 109, 113, 115, 117, 118, 119, 120, 121

(56) References Cited

U.S. PATENT DOCUMENTS 5,828,488 A * 10/1998 Ouderkirk et al. .......... 359/487

FOREIGN PATENT DOCUMENTS

| JP | 54-125997 | 9/1979 |
|----|-----------|--------|
| JP | 54-153066 | 12/1979 |
| JP | 56-57026 | 5/1981 |
| JP | 58-121007 | 7/1983 |
| JP | 63-121822 | 5/1988 |
| JP | 8-201760 | 8/1996 |
| WO | WO 95/17692 | 6/1995 |
| WO | WO 95/17699 | 6/1995 |

* cited by examiner

*Primary Examiner*—Kenneth Parker
*Assistant Examiner*—David Chung
(74) *Attorney, Agent, or Firm*—Armstrong, Westerman & Hattori, LLP

(57) ABSTRACT

The liquid crystal display device comprises a liquid crystal cell with liquid crystals sealed thereinbetween, sandwiched between two transparent substrates having an electrode on each of the inner surfaces thereof facing each other, an absorption-type polarizing film disposed on the visible side of the liquid crystal cell, a reflection-type polarizing film disposed on the side of the liquid crystal cell, opposite from the visible side. The absorption-type polarizing film is a polarizing sheet absorbing a light linearly polarized in the direction orthogonal to the transmission axis thereof while the reflection-type polarizing film is a polarizing sheet reflecting a light linearly polarized in the direction orthogonal to the transmission axis thereof. A light reflection film or a color filter may preferably be disposed under the reflection-type polarizing film. Further, a light diffusing layer or a light diffusing film may preferably be disposed on the visible side of the absorption-type polarizing film.

12 Claims, 5 Drawing Sheets

LIQUID CRYSTAL DISPLAY

TECHNICAL FIELD

The invention relates to a liquid crystal display device for use as a display panel in various electronic equipment such as a timepiece (watch and clock), portable information equipment, and so forth.

BACKGROUND TECHNOLOGY

A timepiece for indicating digital display of time information such as the hour, minute, and second, and calendar information such as the date, days of the week, the month, and the year, by use of a liquid crystal display panel, has been in widespread use for wrist watches and clocks, provided with a crystal oscillation circuit.

There has also been in use a combination watch wherein an analog display indicating time information by the hands of the watch is used in combination with digital display indicating time information and calendar information in numbers and letters.

Further, there has been proposed an analog watch for selectively displaying markers in various patterns, or for displaying simulated hands for an hour hand, a minute hand, and a second hand, by providing the dial thereof based on a liquid crystal display panel (refer to, for example, Japanese Patent Laid-open S 54-153066).

A reflective-type liquid crystal display device, small in size and consuming very little electric power, has been in widespread use as a display panel for displaying necessary information (character information and graphic information) in various electronic equipment other than a timepiece, such as cellular phones, desktop electronic computers, game players, and so forth.

As such a liquid crystal display device as described above, in a conventional liquid crystal display panel, a liquid crystal cell filled with liquid crystals is sandwiched between two transparent substrates having an electrode on respective inner surfaces thereof, facing each other, and an upper polarizing film and a lower polarizing film are disposed, respectively, on the external surface of the transparent substrates, on the opposite sides. If an electric field is applied to the liquid crystals by applying a voltage to a pair of electrodes on the transparent substrates holding the liquid crystal cell therebetween, the optical property of the liquid crystals is changed, thereby locally controlling transmission and absorption of light falling on the liquid crystal display panel such that a predetermined display is effected.

Either of the upper polarizing film or the lower polarizing film is a polarizing film absorbing the light linearly polarized in the direction orthogonal to the transmission axis thereof.

In the case of a watch using the conventional liquid crystal display panel described above, time information and calendar information are displayed in black against a white background in a normally white mode that is common.

However, by simply displaying time information and calendar information in black against the white background as described in the foregoing, neither variation in design nor interest can be offered, with a resulting tendency to lose soon popularity with consumers. Probably, as a result, consumption of digital watches has recently been on the decline, and neither combination watches nor analog watches with a liquid crystal display panel have since received market acceptance.

Similarly, with the conventional liquid crystal display panel used in electronic equipment other than a timepiece, various information expressed in characters and graphics is generally displayed in black against the white background, and although there are some wherein information can be displayed in white against the black background in an inverse mode, the conventional liquid crystal display panel has still been found lacking in design variation and aesthetic qualities.

In light of the present situation as described, the present invention has been developed, and an object of the invention is to provide a liquid crystal display device for use in various electronic equipment such as a timepiece (watch and clock), and so forth, capable of offering attractive variation in, design and displaying information clearly so that a viewer can see the display with greater ease.

DISCLOSURE OF THE INVENTION

To this end, a liquid crystal display device according to the invention comprises a liquid crystal cell with liquid crystals sealed thereinbetween, sandwiched between two transparent substrates having an electrode on each of the inner surfaces thereof facing each other, an only absorption-type polarizing film disposed on a visible side of the liquid crystal cell for a polarizing film, and an only reflection-type polarizing film disposed on a side of the liquid crystal cell, opposite from the visible side thereof for a polarizing film, and is characterized in that the absorption-type polarizing film is a polarizing sheet absorbing the light linearly polarized in the direction orthogonal to the transmission axis thereof while the reflection-type polarizing film is a polarizing sheet reflecting the light linearly polarized in the direction orthogonal to the transmission axis thereof.

With the liquid crystal display device described above, a light reflection film is preferably disposed on a side of the reflection-type polarizing film, opposite from the liquid crystal cell.

Or a color filter may be disposed on a side of the reflection-type polarizing film, opposite from the liquid crystal cell.

A light reflection film may be further disposed on a side of the color film, opposite from the reflection-type polarizing film.

Furthermore, with the liquid crystal display device described above, a light diffusing layer or light diffusing film is preferably disposed on a visible side of the absorption-type polarizing film.

For the color filter described above, any of an absorption-type color polarizing film, a dielectric multi-layered film, or an absorption-type color filter is preferably adopted.

Further, it is desirable that, with respect to the liquid crystal display devices described in the foregoing, the absorption-type polarizing film and the reflection-type polarizing film are disposed such that the transmission axes thereof either cross each other at right angles, or run in parallel with each other.

It is desirable that liquid crystals causing linearly polarized light passing therethrough to undergo phase modulation or intensity modulation are sealed in the liquid crystal cell. For such the liquid crystals, twisted nematic liquid crystals, supertwisted nematic liquid crystals, or guest-host liquid crystals are preferably used.

Furthermore, it is desirable that the absorption-type polarizing film is disposed such that the transmission axis thereof is oriented in the direction parallel with or orthogonal to the long axes of liquid crystal molecules located on a visible side of the liquid crystal cell.

With the liquid crystal display device according to the invention, constructed as described above, half of incoming light falling thereon from the visible side of the liquid crystal cell is absorbed by the absorption-type polarizing film but the other half of the incoming light is transmitted therethrough, falling on the liquid crystal cell, and when transmitted through they, liquid crystal cell, transmitted light is caused to undergo a change in optical property thereof, thereby forming portions of the liquid crystal cell where light is fully reflected by the reflection-type polarizing film, and other portions thereof where light is transmitted therethrough, so that metallic display can be effected.

Depending on whether the transmission axes of the absorption-type polarizing film and the reflection-type polarizing film, disposed on either side of the liquid crystal cell cross each other at right angles or run in parallel with each other, on whether the transmission axis of the absorption-type polarizing film is oriented in the direction parallel with or orthogonal to the direction of the long axes of the liquid crystal molecules located on the visible side of the liquid crystal cell, or depending on types of liquid crystals in use and the method of applying a voltage, either of the background part or the display segment of the liquid crystal cell can be displayed in a metallic color through full reflection of incoming light while the other can be displayed in a dark color, a color of the interior of an electronic equipment, a color reflected by the light reflection film disposed thereunder, or a color transmitted through the color filter.

By way of example, operation is described hereinafter in the case wherein the absorption-type polarizing film and the reflection-type polarizing film disposed above and below the liquid crystal cell, respectively, are arranged such that the transmission axes thereof run in parallel with each other, and the liquid crystal cell with twisted nematic liquid crystals having a twist angle of 90 degrees sealed therein is used.

Half of the incoming light from the visible side (above) of the liquid crystal cell is absorbed by the absorption-type polarizing film. The other half of the incoming light falls on the liquid crystal cell, and is transmitted therethrough. In the background part where no voltage is applied to the liquid crystals of the liquid crystal cell, transmitted light is rotated by 90 degrees, and turned into the light linearly polarized in the direction orthogonal to the transmission axis of the reflection-type polarizing film, thereby being reflected substantially in fill by the reflection-type polarizing film. As a result, the background part is displayed in a metallic color (as against a mirror).

On the other hand, in the display segment of the liquid crystal cell for displaying various information such as time information, calendar information, and so forth, where a voltage is applied to the liquid crystals, light transmitted through the liquid crystal cell is not rotated, and is turned into the light linearly polarized in the direction parallel with the direction of transmission axis of the reflection-type polarizing film, thereby being allowed to pass through the reflection-type polarizing film. Consequently, the display segment is displayed in a dark color, or can be displayed in a transparent state so as to show the internal structure of an electronic equipment in which the liquid crystal display device is mounted. Otherwise, if the light reflection film or the color filter is disposed on the underside of the reflection-type polarizing film, the display segment can be displayed in an optional color such as a color reflected by the light reflection film, or a color transmitted through the color filter.

Hence, the invention can provide a liquid crystal display device having variation in design and offering users a sense of amusement.

Furthermore, with the liquid crystal display device of the invention described above, if a light diffusing film or a light diffusing layer is disposed on the visible side of the absorption-type polarizing film, this will cause light reflected by the reflection-type polarizing film to be diffused, thereby turning display in a metallic tone into display in whiter and softer tones so as to be seen by a user with greater ease while improving a viewing angle characteristic of the liquid crystal display panel as well.

BEST MODE FOR CARRYING OUT THE INVENTION

Preferred embodiments of a liquid crystal display device according to the invention will be described in detail hereinafter with reference to the attached drawings.

Figure 1:
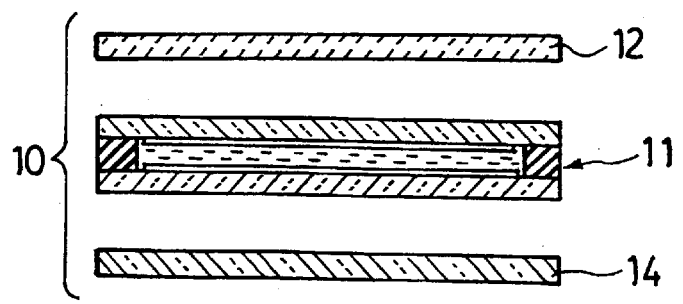
FIG. 1 is a schematic sectional view showing the construction of a first embodiment of a liquid crystal display device according to the invention.
Figure 2:
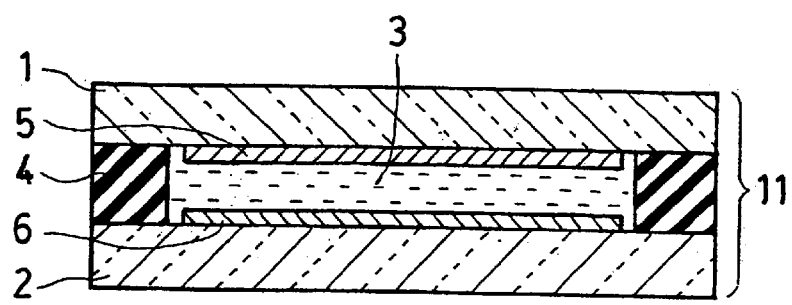
FIG. 2 is an enlarged sectional view showing the construction of a liquid crystal cell of the liquid crystal display device.

First Embodiment: FIGS. 1 and 2

First, a first embodiment of a liquid crystal display device according to the invention, which is the most basic embodiment, is described with reference to FIGS. 1 and 2.

FIG. 1 is a schematic sectional view for illustrating the construction of a liquid crystal display panel making up the liquid crystal display device, and the Figure shows an enlarged view of a liquid crystal cell and respective polarizing films with respect to thicknesses thereof and respective spacings therebetween.

As shown in FIG. 1, the liquid crystal display panel 10 is made up of a liquid crystal cell 11, absorption-type polarizing film 12 disposed on the visible side (the upper side in the Figure) of the liquid crystal cell 11, reflection-type polarizing film 14 disposed on the opposite side (the underside in the figure) of the liquid crystal cell 11.

As shown in FIG. 2, the liquid crystal cell 11 comprises two glass substrates 1, 2, and liquid crystals 3 sandwiched between the two glass substrates so as to be sealed in with sealing agents 4, and a twisted nematic (TN) liquid crystal compound having a twist angle of not more than 90 degrees is used for the liquid crystals 3.

Transparent electrodes 5, 6, made of indium tin oxide (ITO), are formed on the inner faces of the two glass substrates 1, and 2, respectively, on the side in contact with the liquid crystals 3, and an aligning treatment is further applied to the inner face of the respective transparent electrodes, in contact with the liquid crystals 3, such that liquid crystal molecules are aligned in a predetermined direction.

The alignment condition of the liquid crystals 3 held between the transparent electrodes 5, 6 is altered by applying a voltage between the transparent electrodes 5, 6, thereby indicating various information in digital display or graphic display.

The absorption-type polarizing film 12 and the reflection-type polarizing film 14, disposed above and below the liquid crystals cell 11, respectively, with the liquid crystal cell 11 interposed therebetween, are arranged so that respective transmission axes are aligned parallel with each other.

Further, the absorption-type polarizing film 12 disposed on the visible side is installed such that the transmission axis thereof is oriented in the direction of (that is, in parallel with) the long axes of liquid crystal molecules located on the visible side of the liquid crystals cell 11.

The absorption-type polarizing film 12 is a polarizing sheet absorbing the light linearly polarized in the direction orthogonal to the transmission axis thereof, and is the same as a conventional polarizing film in common use.

On the other hand, the reflection-type polarizing film 14 is a polarizing sheet reflecting the light linearly polarized in the direction orthogonal to the transmission axis thereof. For example, an optical film, DBEF (trade name), manufactured by Minnesota Mining and Manufacturing Co., U.S.A., is used for the reflection-type polarizing film 14. The same can be obtained from Sumitomo 3M Co., Ltd., in Japan The reflective type polarizing sheet described above has been developed by the manufacturer described above, and disclosed in detail in JP (PCT) H9-507308A (International Publication No.: WO95/17691) and JP(PCT)H9-511844A (International Publication No.: WO95/27919).

With the liquid crystal display panel 10 according to this embodiment of the invention, half of the external light incoming from above as in FIG. 1 is first absorbed by the absorption-type polarizing film 12 disposed the visible side of the liquid crystal cell 11, and the other half thereof is transmitted therethrough, falling on the liquid crystal cell 11. Since no voltage is applied to the liquid crystals 3 of the liquid crystal cell 11 in the background part of information display, the transmitted light falling thereon is rotated through 90 degrees by the liquid crystals 3 (in this case, twisted-nematic crystals) when transmitted through the liquid crystal cell 11 and is turned to the light linearly polarizing in the direction orthogonal to the transmission axis of the reflection-type polarizing film 14. Consequently, the linearly polarized light transmitted through the liquid crystal cell 11 is substantially reflected in fill by the reflection-type polarizing film 14 disposed underneath the liquid crystal cell 11, and such reflected light outgoes along the optical path described above but in the reverse direction, thus indicating the background part of the information display in a metallic color as is reflected by a mirror.

In the display segment of the liquid crystal cell 11, where a voltage has been applied for displaying information, incoming light transmitted through the absorption-type polarizing film 12 and falling on the liquid crystal cell 11 is not rotated by the liquid crystals 3 when transmitted through the liquid crystal cell 11, and is turned to the light linearly polarized in the direction running parallel with the direction of the transmission axis of the reflection-type polarizing film 14, thereby being allowed to pass through the reflection-type polarizing film 14.

Accordingly, if a light absorption member (layer, film, sheet, etc.) is installed on the underside of the liquid crystal display panel 10, most of the light transmitted through the reflection-type polarizing film 14 will be absorbed thereby, so that light reflected towards the visible side will be eliminate thus indicating the display segment in a black or a dark color.

However, if a white film, a gray film, or a variously colored film (or sheet) is installed in place of the light absorption member, irregular reflection therefrom causes information to be displayed colorfully in a white, a gray, or an optional color, distinct from a metallic color in which the background is displayed.

Otherwise, by mounting the liquid crystal display panel 10 as it is in an electronic equipment such as an electronic timepiece, and so forth, it is possible to display the background part in the metallic color while, in the display segment for displaying information, the internal structure of the electronic equipment will become visible from the outside, thereby providing an amusing display.

Accordingly, in marked contrast with the conventional liquid crystal display panel for indicating digital display of time information, calendar information, and so forth, and indicating display of various information in a black or a dark color against the background in a white or a gray color, the liquid crystal display panel according to the invention is capable of indicting display in a transparent color or in an optional color against the background, in a metallic tone, offering variation and enhancing a user's sense of amusement.

Further, if the absorption-type polarizing film 12 and the reflection-type polarizing film 14, disposed above and below the liquid crystal cell 11, respectively, with the liquid crystal cell 11 interposed therebetween, are arranged such that respective transmission axes thereof cross each other at right angles so as to conform to the twist angle of the liquid crystals 3, the display condition can be inverted between the background part and the display segment, thereby enabling various information to be displayed in a mirror-like metallic color against the background in a dark, a transparent or an optional color.

Needless to say, it is to be pointed out that the invention is applied to not only a liquid crystal display device using a liquid crystal display panel for indicating digital display wherein the electrodes 5, 6 of the liquid crystal cell 11 are formed in a plurality of segment patterns such as a seven-segment pattern for displaying numbers, and so forth, but also to a liquid crystal display device using a liquid crystal display panel for displaying various characters and graphics wherein the electrodes 5, 6 of the liquid crystal cell 11 are formed in a dot-matrix pattern.

The case wherein the liquid crystals that are sealed in the liquid crystal cell 11 are twisted nematic (TN) liquid crystals, causing linearly polarized light passing therethrough to undergo phase modulation, has been described in the foregoing by way of example. However, supertwisted nematic (STN) liquid crystals and guest host liquid crystals causing linearly polarized light passing therethrough to undergo intensity modulation may be used instead.

The guest-host liquid crystals belong to a mixed type liquid crystal and are produced by dissolving a dichroic dye as solute in liquid crystal compounds as solvent. If the alignment condition of the guest-host liquid crystal molecules is caused to change by applying an electric field thereto, alignment of the dichroic dye can be controlled following movement of the guest-host liquid crystal molecules, thereby indicating display after modulating absorption of light incoming from a given direction.

Accordingly, by putting the guest host liquid crystals to use as the liquid crystals 3 of the liquid crystal cell 11 in the liquid crystal display panel described above, it is made easier to color the display segment against the background shown in a metallic color.

Second to Eighth Embodiments: FIGS. 3 to 9

Now, second to eighth embodiments of a liquid crystal display device according to the invention are described with reference to FIGS. 3 to 9. FIGS. 3 to 9 are schematic sectional views, similar to FIG. 1, each showing the construction of a liquid crystal display panel used in carrying out the respective embodiments of a liquid crystal display device according to the invention. In these figures, parts corresponding to those previously described with reference to FIG. 1 are denoted by the same reference numerals, and description thereof is omitted.

Figure 3:
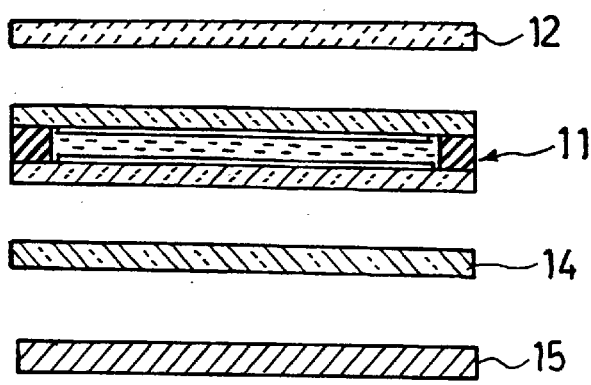
FIGS. 3 to 9 are schematic sectional views for illustrating the construction of second to eighth embodiments of a liquid crystal display device according to the invention, respectively.

FIG. 3 shows the construction of a liquid crystal display panel used in the liquid crystal display device according to the second embodiment of the invention, and this liquid crystal display panel differs from the liquid crystal display panel according to the first embodiment of the invention, as shown in FIG. 1, only in that a light reflection film 15 is disposed on a side (the underside in the figure) of a reflection-type polarizing film 14, opposite from a liquid crystal cell 11, the reflection-type polarizing film 14 being disposed on a side of the liquid crystal cell 11, opposite from a visible side thereof.

For the light reflection film 15, a member made of a film-like substrate with a film of metal such as aluminum, nickel and so forth, formed thereon, or a dielectric multi-layered film is used. Further, a light reflection film with a mirror-like surface may be used, however, a light reflection film in a gold color with somewhat roughened surface, a light reflection film in a white or a gray color, or a colored light reflection film causing a light component at a specific wavelength only to undergo irregular reflection (any of these light reflection films may be a light reflection sheet or a light reflection film provided with coating etc.) may be used as well.

Light transmitted through the reflection-type polarizing film 14 can be reflected by the light reflection film 15 so as to outgo towards the visible side along the same optical path as that for incoming light but in the reverse direction.

As a result, a utilization efficiency of light is enhanced, enabling bright display to be executed by virtue of a metallic color in sharp contrast with a white color, a gray color, or an optional color.

Further, in the case wherein the light reflection film with the mirror-like reflection surface is used for the light reflection film 15, both the background part and the display segments will be in a display condition in a metallic tone due to total reflection. However, color tones of respective parts can be differentiated as those of silver against gold, and in addition, display, when seen from a somewhat slant viewing angle, will have a three-dimensional effect due to a difference in the position of light reflection between the respective parts.

Figure 4:
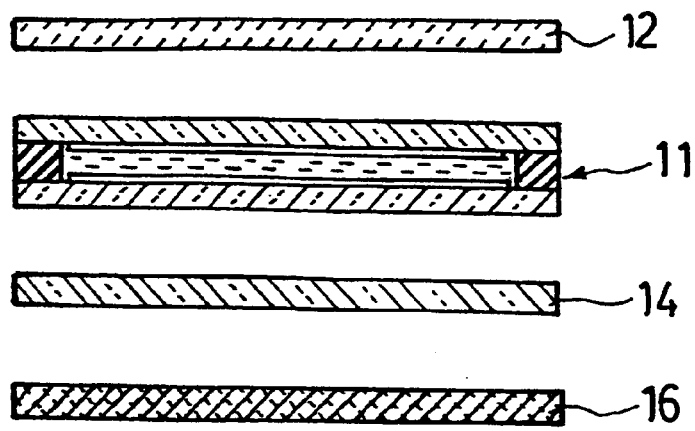

FIG. 4 shows the construction of a liquid crystal display panel used in the liquid crystal display device according to the third embodiment of the invention. This liquid crystal display panel differs from the liquid crystal display panel according to the first embodiment of the invention, as shown in FIG. 1, only in that a color filter 16 is disposed on a side (the underside in the figure) of a reflection-type polarizing film 14, opposite from a liquid crystal cell 11, the reflection-type polarizing film 14 being disposed on a side of a liquid crystal cell 11, opposite from a visible side thereof.

For the color filter 16, an absorption-type color polarizing film, a dielectric multi-layered film, or a selective absorption-type filter is adopted.

As a component of light transmitted through the reflection-type polarizing film 14, at a specific wavelength only, can be transmitted through the color filter 16 which is disposed underside of the reflection-type polarizing film 14, display parts for various information can be colored by disposing a white film thereunder.

Figure 5:
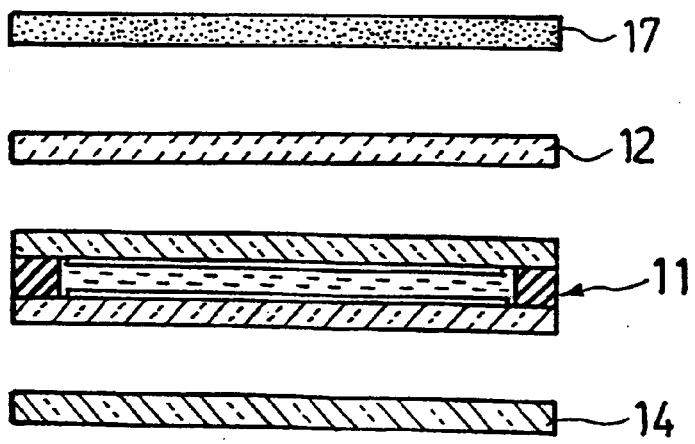

FIG. 5 shows the construction of a liquid crystal display panel used in the liquid crystal display device according to the fourth embodiment of the invention. This liquid crystal display panel differs from the crystal display panel according to the first embodiment of the invention, as shown in FIG. 1, only in that a light diffusing film (scattering film) 17 is disposed on a visible side (the topside in the Figure) of an absorption-type polarizing film 12 disposed on a visible side of a liquid crystal cell 11.

The light diffusing film 17 is formed, for example, by applying a binder with silica particles consisting of silicon oxide, acrylic beads, or calcium powders that are mixed therein to a transparent film-like substrate. Or the light diffusing film 17 may be formed by applying embossing to the surface of a transparent base film The light diffusing film 17 may be formed by sticking such a film described above directly to the upper surface of the absorption-type polarizing film 12, or by coating the same with a light diffusion agent.

With such a construction as described above, wherein the light diffusing film 17 or a light diffusing layer is disposed on the visible side of the absorption-type polarizing film 12, light reflected by the reflection-type polarizing film 14 acting like a mirror is diffused, thereby moderating a metallic tone in which the background part is indicated and turning the display into softer and more elegant tones while improving a viewing angle characteristic of the liquid crystal display panel as well.

Figure 6:
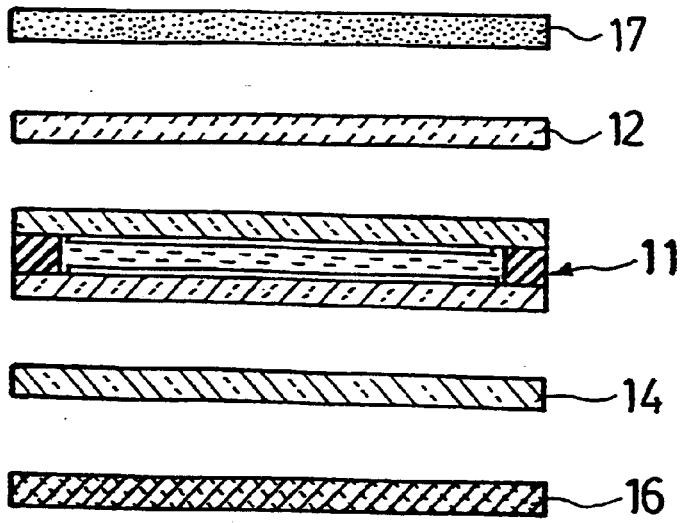

FIG. 6 shows the construction of a liquid crystal display panel used in the liquid crystal display device according to the fifth embodiment of the invention. This liquid crystal display panel differs from the crystal display panel according to the fourth embodiment of the invention, as shown in FIG. 5, only in that a color filter 16 is disposed on a side (the underside in the figure) of a reflection-type polarizing film 14, opposite from a liquid crystal cell 11.

The color filter 16 is of the same kind as the color filter 16 described in the third embodiment of the invention with reference to FIG. 4.

Accordingly, the liquid crystal display panel according to the fifth embodiment has the function of the liquid crystal display panel according to the third embodiment (FIG. 4) in combination with that of the fourth embodiment (FIG. 5), so that display can be indicated in softer and more elegant tones by moderating a metallic tone in which the background part is indicated while improving a viewing angle characteristic and capable of displaying information in an optional color.

Figure 7:
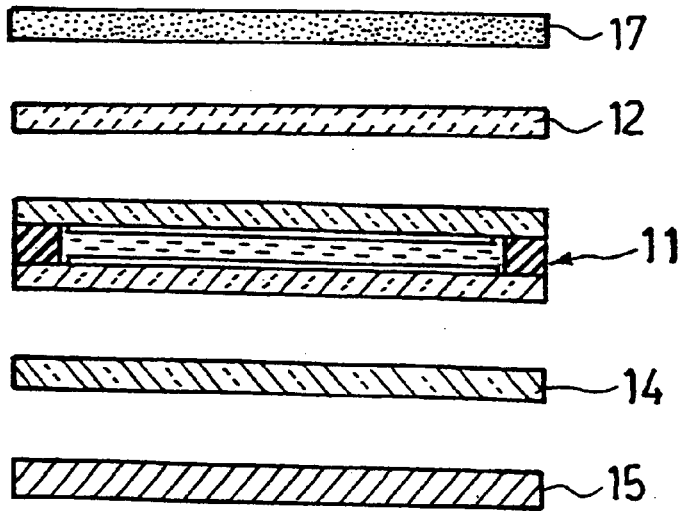

FIG. 7 shows the construction of a liquid crystal display panel used in the liquid crystal display device according to the sixth element of the invention. This liquid crystal display panel differs from the crystal display panel according to the fourth embodiment of the invention, as shown in FIG. 5, only in that a light reflection film 15 is disposed on a side (the underside in the Figure) of a reflection-type polarizing film 14, opposite from a liquid crystal cell 11.

The light reflection film 15 is of the same kind as the light reflection film 15 described in the second embodiment of the invention with reference to FIG. 3.

Accordingly, the liquid crystal display panel according to the sixth embodiment has the function of the second embodiment (FIG. 3) in combination with that of the fourth embodiment (FIG. 5), so that display can be indicated in softer and more elegant tones by moderating a metallic tone in which the background part is indicated while improving a viewing angle characteristic and capable of providing a bright display by improving the utilization efficiency of light.

Figure 8:
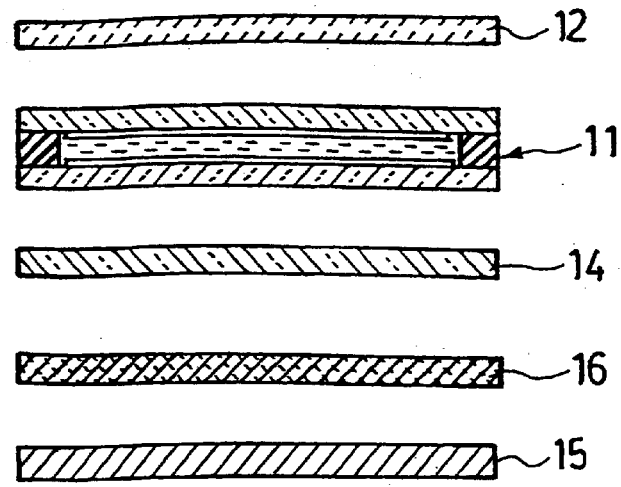

FIG. 8 shows the construction of a liquid crystal display panel used in the liquid crystal display device according to the seventh embodiment of the invention. This liquid crystal display panel differs from the crystal display panel according to the third embodiment of the invention, as shown in FIG. 4, only in that a light reflection film 15 is disposed on a side (the underside in the figure) of a color filter 16, opposite from a reflection-type polarizing film 14.

This light reflection film 15 is of the same kind as the light reflection film 15 described in the second embodiment of the invention with reference to FIG. 3.

Accordingly, the liquid crystal display panel according to the seventh embodiment has the function of the third embodiment (FIG. 4) in combination with that of the second embodiment (FIG. 3), so that light transmitted through both the reflection-type polarizing film 14 and the color filter 16 is reflected by the light reflection film 15 towards the visible side. As a result, colored display of various information can be provided against the background in a metallic tone while the display can be rendered brighter by improving the utilization efficiency of light.

Figure 9:
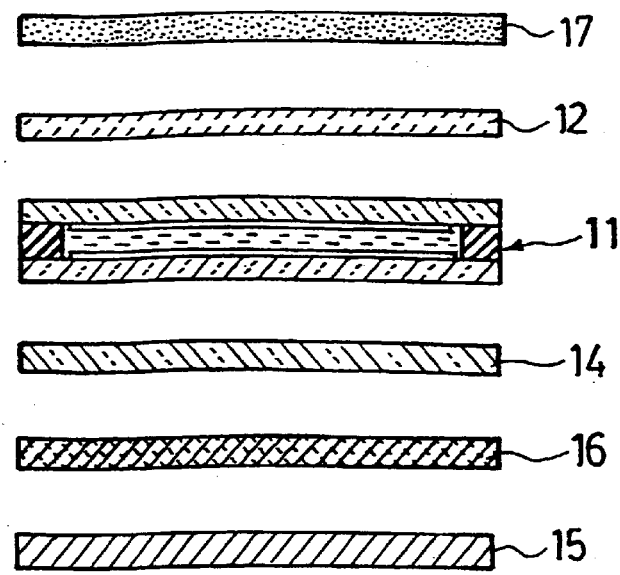

FIG. 9 shows the construction of a liquid crystal display panel used in the liquid crystal display device according to the eighth embodiment of the invention. This liquid crystal display panel differs from the crystal display panel according to the seventh embodiment of the invention, as shown in FIG. 8, only in that a light diffusing film 17 is disposed on a visible side (the topside in the figure) of the absorption-type polarizing film 12.

The light diffusing film 17 is of the same kind as the light diffusing film 17 described in the fourth embodiment of the invention with reference to FIG. 5, and may be a light diffusing layer.

Accordingly, the liquid crystal display panel according to the eighth embodiment has the function of the seventh embodiment of the invention as described with reference to FIG. 8 in combination with that of the fourth embodiment of the invention as described with reference to FIG. 5, so that a bright display can be indicated in softer and more elegant tones by moderating a metallic tone in which the background part is indicated while improving a viewing angle characteristic of the liquid crystal display panel.

In any of the embodiments described in the foregoing, various modifications described in the first embodiment can be applied for the same effects.

Application Example of the Liquid Crystal Display Device of the Invention

Now a digital quartz watch wherein the liquid crystal display device according to the invention is used will be described hereinafter by way of example.

Figure 10:
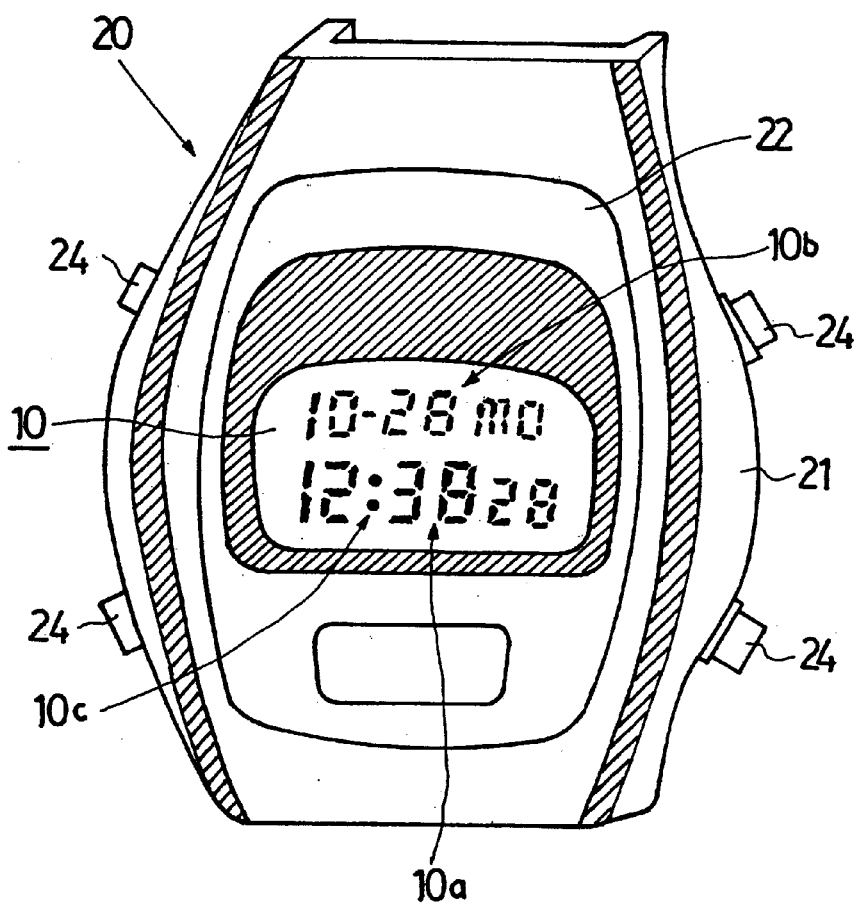
FIG. 10 is a perspective view showing the external view of a quartz watch for illustrating an application example of the liquid crystal display device according to the invention.
Figure 11:
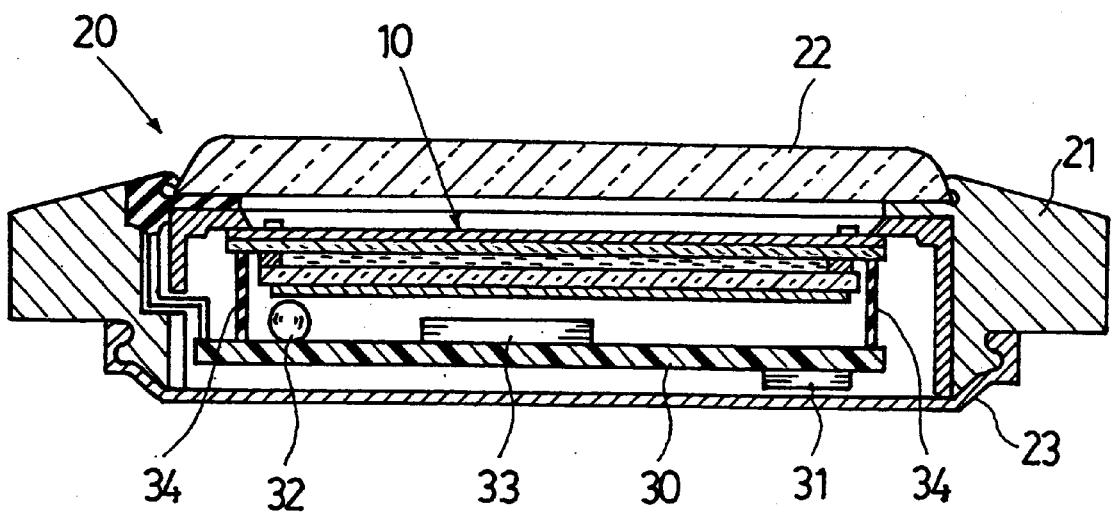
FIG. 11 is a sectional view showing the internal construction of the quartz watch.

FIG. 10 is a perspective view of the watch showing the external view thereof and FIG. 11 is a sectional view showing the internal structure thereof.

A case 20 of the quartz watch comprises of a glass 22 and a case back 23, integrally joined with a case body 21 made of metal.

The glass 22 is made of a transparent material such as sapphire glass, tempered glass, or plastic, and is integrally joined with the front face of the case body 21 by means of direct bonding, or fitting therein using packing. The case back 23 is integrally joined with the back face of the case body 21 by means of screws or fittings using packing.

Thus, the case 20 has an airtight inner structure so as not to allow ingress of dust or moisture.

A liquid crystal display panel (liquid crystal display device) 10 to serve as a display for indicating time and so forth is installed on the side of the glass 22 inside the case 20.

The liquid crystal display panel 10 comprises a time display section 10a for displaying the hour, minute, and second, a calendar display section 10b for displaying month, day, days of the week, and a colon mark display section 10c that blinks every second, for example.

Further, the liquid crystal display panel 10 is capable of displaying functions including time display for 12 consecutive hours or 24 consecutive hours as usual, an alarm function, a stopwatch function, a timer function, and so forth.

Changeover among such various functions, and correction of time, are executed by manipulating a plurality of switching buttons 24 installed in the side of the case body 21 of the case 20. A packing is provided between each of the switching buttons 24 and the case body 21 so as not to allow ingress of dust and moisture into the case 20.

As shown in FIG. 11, the quart watch has an inner structure such that the liquid crystal display panel 10 and a printed circuit board 30 are disposed substantially parallel with each other inside the case 20, and a battery 31 for serving as a driving power source of the printed circuit board 30 is installed on the case back 23 side of the printed circuit board 30.

A semiconductor integrated circuit 33 comprising a crystal oscillator 32 having an oscillation frequency of 32,768 Hz, a crystal oscillation circuit for generating a predetermined signal by oscillating the crystal oscillator, a counting-down circuit, a driving circuit for driving the liquid crystal display panel 10, a central processing unit (CPU) for overall control of the quartz watch, and so forth, is mounted on the printed circuit board 30.

The liquid crystal display panel 10 is electrically connected with the printed circuit board 30 via a zebra-rubber connector 34 disposed therebetween. The zebra-rubber connector 34 is disposed so as to be compressed thicknesswise in order to ensure electrical connection between the liquid crystal display panel 10 and the printed circuit board 30.

The zebra-rubber connector 34 is made up of electrically conductive layers, composed of insulating silicone rubber with carbon and metallic particles contained therein, and formed at a predetermined pitch, and electrically conductive in the direction of thickness thereof via the respective electrically conductive layers, but is in a transversely insulated condition between adjacent electrically conductive layers.

A connection terminal pattern is formed on the faces of the liquid crystal display panel 10 and the printed circuit board 30, opposite to each other, respectively, in such a fashion as to correspond to vertically conductive parts of the zebra-rubber connector 34, formed of the electrically conductive layer, respectively, and insulation parts of the zebra-rubber connector 34, alternately disposed, and in dimensions at the same pitch as that for the vertically conductive parts.

With the watch, external light falling on the reflective-type liquid crystal display panel 10 from the side of the glass 22 (the visible side) can indicate digital display of time information such as the hour, minute, and second, and calendar information such as date, days of the week, month, and year in various states (in a dark color, a white color, various other colors, or in such a state as to allow the internal structure of the watch to be visible from outside) against the background shown in a metallic tone.

Conversely, the display condition can be inverted between the background part and the display segment of the liquid crystal display panel 10 so that time information, calendar information, and so forth can be displayed in a metallic tone.

Any of the liquid crystal display panels described hereinbefore in the first to the eighth embodiments may be used as the liquid crystal display panel 10.

With the liquid crystal display panel 10, an internal light source is not required because display is indicated through reflection of incoming external light However, in order to enable display to be executed even in locations where no external light is available, for example, at night or dark locations, a backlight may be installed on the underside of the liquid crystal display panel 10 (shown in any of FIGS. 1, 4, 5 and 6), so that transmission display can be effected by lighting up the backlight only when any of the switches 24 is pressed down.

INDUSTRIAL APPLICABILITY

As described in the foregoing, with the liquid crystal display device according to the invention, various information can be displayed in various states such as in a dark color, a white color, various other colors, or in such a state as to allow the internal structure of an electronic equipment to be visible from outside against the background like a mirror or in a softened metallic tone when external light falls thereon.

Further, by inverting display conditions between the background part and the information display segment of the liquid crystal display panel, characters, numbers, graphics, or so forth for representing various information can be displayed in a metallic tone.

Accordingly, the liquid crystal display device according to the invention can be used as a display panel incorporated in various electronic equipment such as a digital quart timepiece, other portable electronic equipment and so forth, thereby enabling novel and amusing electronic equipment adaptable to variation in design to be provided.

What is claimed is:

1. A liquid crystal display device comprising:

a liquid crystal cell with liquid crystals sealed therein between, sandwiched between two transparent substrates having an electrode on each of inner surfaces thereof facing each other;

an only absorption-type polarizing film disposed on a visible side of the liquid crystal cell for a polarizing film; and an only reflection-type polarizing film disposed on a side of the liquid crystal cell, opposite from the visible side thereof for a polarizing film;

said absorption-type polarizing film is a polarizing sheet absorbing light linearly polarized in the direction orthogonal to the transmission axis thereof;

said reflection-type polarizing film is a polarizing sheet reflecting light linearly polarized in the direction orthogonal to the transmission axis thereof, wherein a color filter is disposed on a side of the reflection-type polarizing film, opposite from the liquid crystal cell.

2. A liquid crystal display device according to claim 1, wherein the color filter is an absorption-type color polarizing film, a dielectric multi-layered film, or an absorption-type color filter.

3. A liquid crystal display device according to claim 1, wherein a light diffusing layer, or a light diffusing film is disposed on a visible side of the absorption-type polarizing film.

4. A liquid crystal display device according to claim 1, wherein a light reflection film is disposed on a side of the color filter, opposite from the reflection-type polarizing film.

5. A liquid crystal display device according to claim 1, wherein the absorption-type polarizing film and the reflection-type polarizing film are disposed such that the transmission axes thereof cross each other at right angles.

6. A liquid crystal display device according to claim 1, wherein the absorption-type polarizing film and the reflection-type polarizing film are disposed such that the transmission axes thereof run in parallel with each other.

7. A liquid crystal display device according to claim 1, wherein the liquid crystal cell with twisted nematic liquid crystals sealed therein between, sandwiched between two transparent substrates having an electrode on each of inner surfaces thereof facing each other.

8. A liquid crystal display device according to claim 1, wherein the liquid crystal cell with supertwisted nematic liquid crystals sealed therein between, sandwiched between two transparent substrates having an electrode on each of inner surfaces thereof facing each other.

9. A liquid crystal display device according to claim 1, wherein the liquid crystal cell with guest-host liquid crystals sealed therein between, sandwiched between two transparent substrates having an electrode on each of inner surfaces thereof facing each other.

10. A liquid crystal display device according to claim 1, wherein the absorption-type polarizing film is disposed such that the transmission axis thereof is oriented in the direction parallel with or orthogonal to the long axes of liquid crystal molecules located on a visible side of the liquid crystal cell.

11. A liquid crystal display device according to claim 4, wherein the light reflection film is a member made of a film-like substrate with a film of metal, or a dielectric multi-layered film.

12. A liquid crystal display device according to claim 4, wherein the light reflection film is one with a mirror-like surface or a roughened surface, or a colored light reflection film causing a light component at a specific wavelength only to undergo irregular reflection.

* * * * *